(12) United States Patent
Leisure et al.

(10) Patent No.: US 8,802,180 B2
(45) Date of Patent: Aug. 12, 2014

(54) MICRONUTRIENT SUPPLEMENT

(75) Inventors: Nicholas J. Leisure, Rushville, IN (US); Carla C. Jackson, Indianapolis, IN (US); Mingsheng Huang, Carmel, IN (US); Theodore B. Moore, Greenwood, IN (US); Fredrick A. Steward, Pittsburg, PA (US)

(73) Assignee: Heritage Technologies, LLC, Indianapolis, IN (US)

( * ) Notice: Subject to any disclaimer, the term of this patent is extended or adjusted under 35 U.S.C. 154(b) by 25 days.

(21) Appl. No.: 13/605,698

(22) Filed: Sep. 6, 2012

(65) Prior Publication Data

US 2013/0064963 A1    Mar. 14, 2013

Related U.S. Application Data

(60) Provisional application No. 61/532,402, filed on Sep. 8, 2011.

(51) Int. Cl.
    *A23L 1/304* (2006.01)
(52) U.S. Cl.
    USPC .............................. 426/648; 426/74; 426/807
(58) Field of Classification Search
    USPC ........................................... 426/74, 648, 807
    See application file for complete search history.

(56) References Cited

U.S. PATENT DOCUMENTS

| | | | |
|---|---|---|---|
| 2,480,086 A * | 8/1949 | Moss et al. ................. | 426/97 |
| 3,941,818 A | 3/1976 | Abdel-Monem | |
| 4,021,569 A | 5/1977 | Abdel-Monem | |
| 4,103,003 A | 7/1978 | Ashmead | |
| 4,351,735 A * | 9/1982 | Buddemeyer et al. ............ | 252/1 |
| 4,546,195 A | 10/1985 | Helbig et al. | |
| 4,900,561 A | 2/1990 | Abdel-Monem et al. | |
| 4,948,594 A | 8/1990 | Abdel-Monem et al. | |
| 5,061,815 A | 10/1991 | Leu | |
| 5,160,753 A | 11/1992 | Van Benthem et al. | |
| 5,278,329 A | 1/1994 | Anderson | |
| 5,397,576 A | 3/1995 | Mergens et al. | |
| 5,451,414 A | 9/1995 | Steward | |
| 5,583,243 A | 12/1996 | Abdel-Monem | |
| 5,698,724 A | 12/1997 | Anderson et al. | |
| 5,985,340 A | 11/1999 | Boley | |
| 6,114,379 A | 9/2000 | Wheelwright et al. | |
| 6,265,438 B1 * | 7/2001 | Steward ................. | 514/492 |
| 6,531,167 B1 | 3/2003 | Persson et al. | |
| 7,523,563 B2 | 4/2009 | Hopf | |
| 2010/0222219 A1 | 9/2010 | Lohmann et al. | |
| 2013/0224794 A1 * | 8/2013 | Jiang et al. ................ | 435/68.1 |

OTHER PUBLICATIONS

International Search Report and Written Opinion from corresponding PCT application No. PCT/US2012/053960 dated Jan. 31, 2013 12 pgs).
International Preliminary Report on Patentability and Written Opinion from corresponding PCT application No. PCT/US2012/053960 dated Mar. 20, 2014 (9 pgs).

* cited by examiner

*Primary Examiner* — Helen F Heggestad
(74) *Attorney, Agent, or Firm* — Brinks Gilson & Lione

(57) ABSTRACT

A micronutrient supplement which is made by reacting a metal oxide, or metal hydroxide, or metal carbonate of an essential mineral and an acid and/or a metal salt of an essential mineral containing a digestible binder to form a slurry of micronutrient crystals and a digestible binder and forming agglomerated particles of the micronutrient crystals from the slurry. The agglomerated particles provide a non-dusting, free-flowing micronutrient supplement that can be produced with desired particle sizes and densities so as to be easily mixed with a variety of feed mixtures. The digestible binder in the agglomerated particles reduces the opportunity for interactions between the micronutrient crystals and other ingredients that can be present in complex feed mixtures while allowing release of the micronutrients in an animal's digestive system.

15 Claims, No Drawings

_US 8,802,180 B2_

MICRONUTRIENT SUPPLEMENT

RELATED APPLICATION

This application is based on U.S. Provisional Application Ser. No. 61/532,402, filed Sep. 8, 2011, to which priority is claimed under 35 U.S.C. §120 and of which the entire specification is hereby expressly incorporated by reference.

BACKGROUND

The present invention relates generally to micronutrient supplements for food or animal feeds that enhance the survivability, growth, health and/or reproductivity of humans and other animals. More specifically, this invention is directed to a significant improvement of micronutrient supplements that include a basic salt of at least one essential metal, which provide high bioavailability of the essential metal to humans and other animals, and to a method of producing the micronutrient supplements over a range of particle sizes that enhance incorporating the micronutrient supplements into various foods, food mixtures and supplements.

Micronutrients include vitamins and some elements usually in the form of minerals or metal salts; most notably the elements include calcium, phosphorus, potassium, iron, zinc, copper, magnesium, manganese and iodine. Micronutrients are generally consumed in small amounts, i.e., less than 1 gm/day, usually absorbed unchanged, and many essential elements have catalytic functions. While the micronutrients are often present in minute amounts, their bioavailability is essential for survival, growth, health and reproduction. Micronutrients are important for children and other young animals, particularly during their early development years when they are rapidly growing. Furthermore, many new animal breeds require additional amounts of micronutrients as their abilities to grow at a faster rate while consuming less feed has improved. This intensive growth imposes greater metabolic stresses, causing increased susceptibility to vitamin deficiencies. It is well recognized that the needed micronutrients are often not found or not found in sufficient quantities in their food or feed sources, whether these sources are naturally occurring or commercially prepared. Consequently, virtually all industrial food and feed formulations are fortified with vitamins and minerals. The cost to commercial livestock producers for supplying micronutrients to their livestock herds can be staggering.

While human and animals' needs for additional nutrients have been well documented, the availability of the micronutrients has not always met their needs. It is not sufficient to simply increase amounts of the micronutrients in the food or feed sources. This method is ineffective, wasteful and unsafe. Many of the micronutrients are not readily absorbed; the added amounts of vitamins and minerals are simply excreted without being absorbed. Excess loading of vitamins and minerals is unsafe, and in certain circumstances, excess loading can be toxic, causing severe acute and chronic harm and can even be fatal. Thus, there is a need to provide an inexpensive, readily absorbed micronutrient to decrease costs, reduce waste and to help establish a more precise control of the nutritional requirement for humans and animals.

There is a need to provide a micronutrient supplement that is readily bioavailable, storage stable and compatible with a wide variety of different vitamins. The micronutrient supplement must also be cost-efficient to produce and provide a food source for humans and animals that will increase their survivability, growth, health and/or reproductivity.

Micronutrients are commonly produced and available in the form of salts, oxides and chelates. Oxides are relatively inexpensive; however, they are not as effectively absorbed as salts and chelated forms of micronutrients.

Chelated micronutrients are relatively expensive; however, they are more easily absorbed and have good bioavailability.

Examples of various micronutrients can be found in U.S. Pat. Nos. 4,021,569, 3,941,818, 5,583,243 all to Abdel-Monem, U.S. Pat. No. 4,103,003 to Ashmead, U.S. Pat. No. 4,546,195 to Helbig et al., U.S. Pat. Nos. 4,900,561, 4,948594 both to Abdel-Monem et al. U.S. Pat. No. 5,061,815 to Leu, U.S. Pat. No. 5,278,329 to Anderson, U.S. Pat. No. 5,698,724 to Anderson et al. U.S. Pat. No. 6,114,379 to Wheelwright et al. U.S. Pat. No. 7,523,563 to Hopf and U.S. Patent Application Publication No. 2010/0222219 to Lohmann et al.

One of the present inventors is a co-inventor of U.S. Pat. Nos. 5,534,043, 5,451,414 and 6,265,438. These patents disclose micronutrients that are basic metal salt of the formula $M(OH)_y X_{(2-y)/i}$, and its hydrate forms, where M is metal cation, X is an anion or anionic complex, and i is 1-3 depending on the valency of X.

The micronutrients disclosed in U.S. Pat. Nos. 5,534,043, 5,451,414 and 6,265,438 were originally developed from a process that used spend etchant solutions as a source of the metal cations and a crystallization process to produce a basic metal salt having a particle size of about 30 to 300 microns.

The present invention provides for micronutrients in the form of basic metal salts that have more versatility than similar micronutrients and which have a high degree of bioavailability.

BRIEF SUMMARY

According to various features, characteristics and embodiments of the present invention which will become apparent as the description thereof proceeds, the present invention provides a micronutrient supplement that comprises crystals of a basic salt of at least one essential mineral which crystals are agglomerated with a digestible binder to form digestible agglomerated particles, wherein the size of the crystals is from about 0.1 μm to about 20 μm and the size of the digestible agglomerated particles is from about 50 μm to about 300 μm.

The present invention further provides a method of making a micronutrient supplement which comprises the steps of:

a) reacting a metal oxide, or metal hydroxide, or metal carbonate of an essential mineral and an acid and/or a metal salt of an essential mineral containing a digestible binder; and b) agglomerating the resultant small particles into agglomerated product (i.e. by spray drying).

DETAILED DESCRIPTION OF THE DRAWINGS AND THE PRESENTLY PREFERRED EMBODIMENTS

The present invention is directed to micronutrient supplements and methods of preparing the micronutrient supplements. The micronutrient supplements of the present invention can be administered directly to humans or animals as a solid, a suspension or an admixture containing other nutrients such as vitamins, minerals, and food or animal feeds to enhance the survivability, growth, health and/or reproductivity of humans and animals. The basic salt in the micronutrient supplement includes a divalent or trivalent cation of one or more essential metal, a pharmaceutically acceptable anion, and a hydroxyl moiety. The micronutrient supplement of the present invention provides good bioavailability of the essential metals in that they are readily absorbed or taken up in a biologically-effective amount. The micronutrient can be combined with other nutrients, particularly vitamins, to provide a premixed supplement. The premixed supplement that includes the basic salts according to the present invention can be stored for an extended period of time without significant decrease in the bioactivity of the included vitamin(s).

An essential metal is defined for the purposes of this invention as a pharmaceutically acceptable metal whose uptake by humans or other animals in a biologically effective amount increases their survivability, growth, health and/or reproductivity. The mode of action of the essential metal is not critical for the present invention. For example, the essential metal can act as a co-factor or a catalyst in a metalloenzyme or metalloprotein; it can be absorbed by a variety of tissues. Alternatively, the essential metal or a metabolite thereof can inhibit growth of bacteria or other pathogens detrimental to the survivability, growth, health and/or reproductivity of the animal.

In one embodiment of the present invention, the basic metal salt includes a divalent metal cation, M, a hydroxyl moiety and an anion or anionic complex X. When the basic metal salt of this embodiment of the invention includes a monovalent anion, the basic salt includes a compound of the formula $M(OH)_y X_{(2-y)}$. When the basic salt includes a divalent anion, the basic metal salt includes a compound of the formula $M(OH)_y X_{(2-y)/2}$. And when the basic salt includes a trivalent anion, the basic metal salt includes a compound of the formula $M(OH)_y X_{(2-y)/3}$. In the formulae listed above, preferably M is selected from the group of metal dications that include magnesium, calcium, iron, manganese, zinc, copper, and cobalt, X is a pharmaceutically acceptable anion or anionic complex and y is selected to be a real number greater than 0 but less than 2. In certain embodiments, y can be selected as a non-integer.

In an alternative embodiment of the present invention, the basic metal salt includes a trivalent metal cation, M', a hydroxyl moiety and an anion or anionic complex X. When the basic metal salt of this embodiment of the invention includes a monovalent anion, the basic metal salt includes a compound of the formula $M'(OH)_u X_{(3-u)}$. When the basic salt includes a divalent anion, the basic metal salt includes a compound of the formula $M'(OH)_u X_{(3-u)/2}$. And when the basic salt includes a trivalent anion, the basic metal salt includes a compound of the formula $M'(OH)_u X_{(3-u)/3}$. In the formulae listed above, preferably M' is selected from the group of metal trications that includes cobalt, iron and chromium, X is a pharmaceutically acceptable anion or anionic complex and u is selected to be a real number greater than 0 but less than 3. In certain embodiments, u can be selected as a non-integer. In further embodiments of the present invention more than one metal cation can be included in the basic metal salt.

In the microstructure that makes up the basic salt, the metal cation includes a hydroxyl moiety in its coordination sphere. Thus, within a homologous series of compounds wherein the identity of M (or M') and X remain constant, the hydroxyl moiety does not have to be included in precise stoichiometric units. In these series, y is greater than about 0 but less than 2 (or for M', u is greater than 0 but less than 3). In specific embodiments for a divalent cation of an essential metal, M, it is more preferable that y be greater than about 1.0 but less than or equal to about 1.5. The values of u and y may be dependent upon the experimental conditions used to prepare the basic salt. For example, u or y may be dependent upon the pH at which the salt is prepared; alternatively, u or y may be dependent upon the concentration of the pharmaceutically acceptable anion, X, present in the reaction medium. It is understood that varying the value of y from greater than 0 to less than about 2 (for M', u from greater than 0 to less than 3) influences the solubility, bioavailability, nutritional value and enhanced vitamin stability of the micronutrient supplement.

The anion, X, for the basic metal salt is a pharmaceutically acceptable anion. Pharmaceutically acceptable anions are well known in the art. See, for example, S. M. Berge et al. J. Pharmaceutical Sciences, 66:1-19, 1977 for a listing of pharmaceutically acceptable anions, which is incorporated herein by reference. Examples of pharmaceutically acceptable anions include, but are not limited to: halide, carbonate, bicarbonate, sulfate, sulfite, bisulfate, bisulfite, phosphate, monohydrogen phosphate, dihydrogen phosphate, metaphosphate, pyrophosphate, nitrate and nitrite. The anions can be derived from partially neutralized inorganic acids. Examples of inorganic acids useful for the present invention include HCl, HBr, HI, $H_2SO_4$, $H_3PO_4$, $H_4P_2O_7$, $HNO_2$ and $HNO_3$. Organic acids that are deemed useful for the present invention include formic acid, acetic acid, citric acid and oxalic acid. The basic metal salts generally have pH in water between about pH 1.9 and about pH 8.0. Generally, there is a correlation between the pH and the species of basic metal salt formed, although this may vary somewhat depending upon the ionic matrix from which the compounds were formed. A plethora of basic salts can be prepared for a homologous series of compounds having the same cationic essential metal and pharmaceutically acceptable anion. These basic metal salts can be distinguished from each other by the ratio of the hydroxyl moiety to the pharmaceutically acceptable anion, X, in the basic salt.

Certain of the anions that are useful for the present invention impart significant biological effects in their own right. Specific examples of biologically significant anions include, but are not restricted to: iodide, chloride, and phosphate (phosphorus). These biologically significant anions can also be considered as micronutrients for use in the basic salt of the present invention. Thus, it is within the scope of the present invention to provide basic salts of essential elements that may not necessarily be considered metals such as iodine and chloride. These essential elements are also provided in the basic salt in accordance with this invention.

The basic metal salts are generally water insoluble, but their solubility can depend upon pH. Typically, the basic metal salts have some solubility at a low pH, i.e., pH less than about 2.0 to about 0.1. In addition, certain basic metal salts dissolve in water at a high pH, typically at a pH greater than about 7.5 or 8 to about 11.

The basic reaction for producing the micronutrients according to the present invention involves reacting a metal oxide and an acid and/or a metal salt. As noted above acids used in the reaction can include inorganic acids such as, but not limited to, HCl, HBr, HI, $H_2SO_4$, $H_3PO_4$, $H_4P_2O_7$, $HNO_2$ and $HNO_3$ or organic acids such as, but not limited to, formic acid, acetic acid, citric acid and oxalic acid. Metal salts are exemplified by, but not limited to, $ZnCl_2$, $ZnSO_4$, $CuCl_2$, $MnCl_2$, $Fe(NO_3)_2$, $FeCl_2$, $FeSO_4$, $Co(NO_3)_2$ and $CoI_2$.

Exemplary reactions that can be used to produce basic zinc chloride according to the present invention include:

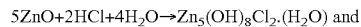
$5ZnO + 2HCl + 4H_2O \rightarrow Zn_5(OH)_8Cl_2 \cdot (H_2O)$ and

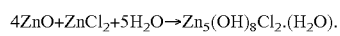
$4ZnO + ZnCl_2 + 5H_2O \rightarrow Zn_5(OH)_8Cl_2 \cdot (H_2O)$.

In addition to these reactions it is possible to react the metal oxides of one metal with metals salts of other metals or to react oxides of different metals with a common metal salt and/or acid to produce "hybrid" crystals or combinations of crystal forms. Understandably, there is a wide range of potential reactions and end products when using these combinations. For example ZnO can be reacted with cupric chloride or manganous chloride.

According to the present invention the basic metal salts are formed by a reaction or reactions that take place in an aqueous medium that contains from about 0.5 wt. % to about 10 wt. %, and preferably form about 1 to about 5 wt. % of a digestible binder, based upon the weight of the finished dried product. Digestible binders that can be used according to the present invention include corn starch, potato starch, rice starch, or modified derivatives, as well as other pharmaceutical acceptable binders. The reaction(s) produces an aqueous slurry in which crystals of the basic metal salts are dispersed. The crystals generally have a size that ranges from about 0.1 µm to about 20 µm.

In order to produce a micronutrient that has a desired size, the reaction slurry is agglomerated by spray drying or other means of agglomeration to form agglomerates of the micronutrient crystals. The parameters of the spray drying process can be controlled to form agglomerates that have average particle sizes of from about 50 µm to about 300 µm. A more detailed description of the overall process follows.

The first step in the procedure is to add a calculated amount of water to a reactor that will result in a final total solids concentration of from about 30 to about 75 wt. %. The goal is to produce the highest solids concentration slurry that is still able to be mixed, pumped, and spray dried. By minimizing the amount of water the energy cost required to evaporate the water in the spray dryer can be minimized. Of course a lower solids concentration can be used at the expense of proportionally increased energy costs to evaporate the water prior to or during spray drying.

Starch is added to the water in the reactor. The amount of starch added is calculated to result in from about 0.5 to about 10 wt. %, or preferrably from about 1 to about 5 wt. % based on the dry weight of finished product in the batch. The starch performs three functions. First, the starch greatly reduces the viscosity of the slurry once the metal oxide or metal salt is added to the reactor. If starch was not used the solids content of the slurry may be limited to only about 45 wt. %. By adding the starch the viscosity can be reduced and the the solids concentration can be increased up to about 60 wt. % or higher. Thus the starch greatly increases production rate in addition to reducing energy cost through the spray dryer. Another function of the starch is to act as a binder during the drying process which holds the small crystals together to form nice stable agglomerates in a desirable particle size range. A further function of the binder is to increase the stability of the product in feed.

After the starch has been added and mixed in the reactor the reactants are added. For illustrative purposes the process will be described with reference to producing basic zinc chloride, it being understood that, as discussed herein, the present invention is not limited to producing basic zinc chloride.

Either HCl (32%) or $ZnCl_2$ solution is then added into the reactor in an amount to stoicheometrically react with the zinc oxide according to the equations above.

Zinc oxide is the last reactant added to the reactor.

Once all ingredients are added into the reactor the reactor is heated to about 180° F. under mixing conditions for a sufficient amount of time to obtain a maximum conversion to the final crystal form (simonkollite). Typically a conversion of greater that 90% can be accomplished in about 4 hours. The degree to which conversion is achieved can be determined by performing X-ray diffraction analysis on the slurry. It is noted that although heating the reactor to 180° F. greatly reduces reaction time the reaction will occur without adding heat; however, at a much slower rate. Once the reaction is completed the slurry is ready to be spray dried.

During the course of the present invention spray drying was tested using a tall form spray dryer called a Nozzel Tower produced by GEA Niro, it being understood that other types of spray dryers could be used. The reaction slurry is introduced into the top of the spray tower via a high pressure nozzle. The high pressure nozzle produces droplets of slurry that fall through the heated air in the nozzel tower (about a 50-foot drop). By the time the droplets reach the bottom of the dryer they are dry particles or agglomerates having a particle size (mean particle size) in the range of from about 50 µm to about 300 µm and preferably about 250 µm. As is known to those skilled in the art there are several parameters that determine what the final particle size will be including nozzel design/orifice size, height of spray dryer, pump pressure, slurry solids content, temperature, and appropriate binder/concentration. These parameters are typically determined by simple trials which can help determine the right size/type of equipment along with proper slurry characteristics to consistently produce product that has a desired particle size in a very narrow particle size distribution. There are several ways to atomize or spray slurries into spray dryers. During the course of the present invention a high pressure nozzel was determined to be particularly suitable for producing the largest particle size and narrowest particle size distribution.

The process of the present invention produces crystals that are formed into larger agglomerate particles using the digestible binder provide, a non-dusting, free-flowing micronutrient product that can be formed with an optimized combination of density and particle size to be readily and quickly blended into a typical complex animal feed mixture. In addition the smaller surface area of the larger agglomerate particles (as compared to the combined surface areas of each of the individual crystals that are agglomerated together) reduces the opportunity for interactions with other ingredients that can be present in complex feed mixtures such as vitamins, enzymes, fats, oils, etc. Since the binder is digestible, once the feed enters the digestive track of an animal the individual crystals of essential trace minerals are slowly released to be digested, absorbed and metabolized. This rate of release can be regulated by the selection of binder used.

The non-dusting and free flowing nature of the micronutrient products of the present invention provides for a number of benefits over current commercial micronutrient products. In this regard, the micronutrient products of the present invention can be metered, fed, transferred and otherwise handled by conventional processing equipment without causing handling problems such as caking and clogging of equipment which can cause processing problems and can lead to undesirable variations in proportioning the micronutrient products into feeds. In addition the free flowing nature of the micronutrient products allows for uniform or homogenous mixing of the micronutrient products into feeds. Such uniform or homogenous mixing can be otherwise challenging for other current commercial micronutrient products, considering that proportions on the order of grams of micronutrient products may be mixed with more than a ton of feed. This ability to easily form uniform or homogeneous mixtures is enhanced by the ability to control the agglomerated particle size and density during particle agglomeration, including selection and amount of binder and particle size. Being able to control agglomerated particle size and density according to the present invention allows customization of micronutrient products that are particularly compatible for a predetermined feed mixture, including convenient unit measuring and easy and uniform or homogeneous mixing.

In addition to improving handling characteristics the non-dusting nature of the micronutrient products of the present invention avoids health risks by those handling the micronutrient products, including those producing the micronutrient products and those mixing the micronutrient products in feeds.

Many of the basic salts prepared according to the present invention are highly water insoluble. Despite this insolubility, the micronutrient supplements are readily absorbed and incorporated into animal tissues. For example, micronutrient supplements containing $Zn_5(OH)_8Cl_2.(H_2O)$, is readily absorbed by chicks when the supplement is included in their feed. The chicks absorb the zinc in the basic zinc salts as readily as, or better than other sources of zinc, including the water soluble zinc species.

The micronutrient supplements of the present invention can be admixed with other nutrients. Nutrients include both micro- and macronutrients. Examples of micronutrients include vitamins and minerals. Examples of vitamins useful for the present invention include: vitamin A, vitamin $D_3$, vitamin E (tocopherol), vitamin K (menadione), vitamin $B_{12}$ (cyanocobalamin), vitamin $B_6$, vitamin $B_1$, vitamin C (ascorbic acid), niacin, riboflavin, thiamine mononitrate, folic acid, calcium pentothenate, pyridoxine, choline chloride, biotin, known pharmaceutically acceptable derivatives of these vitamins and mixtures thereof. Examples of minerals or metal salts useful for the present invention include copper sulfate, iron sulfate, zinc oxide, manganese, iron, iodine, selenium, amino acid complexes of the trace metals and mixtures thereof. The macronutrients that can be used in the present invention include any of the common feed ingredients such as, for example, grain, seeds, grasses, meat meal, fish meal, fats and oils.

The micronutrient supplements of the present invention are provided as non-dusting, and free-flowing agglomerated particles that can be produced to have a particle within the range of from about 50 μm to about 300 μm, and a relatively narrow size distribution about a desired particle size. The narrowness of particle size distribution is defined herein as "span" which is calculated as:

$$\mathrm{span}=[d(0.9)-d(0.1)]/d0.5$$

where:
- d(0.9)—is the size of particle below which 90% of the sample lies
- d(0.1)—is the size of particle below which 10% of the sample lies
- d(0.5)—is the size of particle below which 50% of the sample lies During the course of the present invention agglomerated particles were produced by spray drying that had a span that ranged from about 0.8 to about 1.25.

The ability to control the particle size of the final micronutrient products enables the micronutrient products to be customized for use for a particular feed or supplement mixture. For example it may be desired to provide a certain particle size for mixing with grains or seeds and a different particle size for mixing with grasses, meat meal, fish meal, fats or oils. Further the particle size of the final micronutrient products can be adjusted so as to help make measuring a desired amount of the micronutrients easier.

The choice of the binder can influence the release of the essential minerals in a complex feed mixture. In a feed mixture metals like iron, copper, zinc and manganese can participate in destructive chemical reactions with valuable ingredients like vitamins, enzymes, antibiotics, etc. It is therefore best to have the metal(s) bonded tightly, or otherwise protected to minimize detrimental losses over the time between when a complex feed mixture is prepared and when it is consumed and when the nutrients have been absorbed in an animal's digestive system. On the other hand if the metal is too tightly bonded or protected, the ability of the nutrient to be absorbed in an animal's digestive system can be inhibited.

According to the present invention the choice of the binder and the spray drying operating conditions can produce micronutrient agglomerated particles that can sufficiently protect the nutrients over the time between when a complex feed mixture is prepared and when it is consumed and when the nutrients have been absorbed in an animal's digestive system without binding the nutrients too tightly so inhibit absorption of the nutrients in an animal's digestive system. Pharmaceutical acceptable binders such as corn starch, potato starch, or modified derivatives, are particularly suitable for purposes of the present invention.

As mentioned above according to further embodiments of the present invention the micronutrients can include more than one essential nutrient. In this regard the reactants fed into the reaction vessel (as discussed above) can include oxides and/or salts of one or more essential mineral such as iron, zinc, copper, magnesium, and manganese. In such an embodiment the reaction can produce crystals that include one or more of the essential minerals.

In further embodiments the reaction products, or slurries, from different reaction batches can be combined together before the spray drying process to thereby agglomerate together the nutrient crystals from one or more batches in common agglomerated particles.

As can be appreciated using a combination of reactants that contain more than one essential nutrient and/or combining the slurries from different reaction batches before spray drying the combination according to the present invention will enable the production of a wide variety of combinations of micronutrients. This provides greater control for the end users in regards to mixing and homogeneity of premixes or complete feeds.

Features and characteristics of the present invention will be exemplified by the following examples which are provided as a non-limiting example for illustrative purposes only.

Example 1

In this Example basic copper chloride was produced by reacting cupric oxide with hydrochloric acid according to the following reaction:

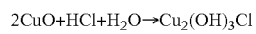

$$2CuO+HCl+H_2O \rightarrow Cu_2(OH)_3Cl$$

In this Example the reactants were added at or near stoichiometry. 287 ml of water was first added into a 1 liter reaction vessel followed by 270 ml HCl (32%). While mixing 436 g of CuO was added followed by 29 g of a modified corn starch binder. As noted above, the starch binder serves three functions. First it greatly reduces the viscosity of the resulting slurry thereby allowing the slurry to be pumpable/mixable. Second the starch binder acts as a binder during the spray drying process. Third, the binder increases the stability of the product in feed.

After mixing for 10 minutes the contents of the reactor (a slurry having about 55% solids) was divided into two aliquots. Both aliquots were mixed for 24 hours, one at ambient temperature and the other heated to 180° F. to determine the effect of temperature on the reaction rate. The reaction was monitored by XRD.

As a result of this Example it was discovered that whereas the copper oxide was converted into basic copper chloride within two hours in the aliquot that was heated to 180° F., the aliquot that was allowed to react at ambient temperature took 24 hours to reach completion.

Example 2

In this Example basic copper chloride is produced by reacting cupric oxide with cupric chloride by the following equation:

$$3CuO+CuCl_2+3H_2O=2Cu_2(OH)_3Cl$$

This reaction was performed by adding 400 ml of water and 128.27 ml of a cupric chloride solution containing 207 g/L of Cu into a 1 liter beaker. While mixing 100 g of cupric oxide was added to the solution. The mixture was heated to 180° F. and allowed mix and react for 24 hours. The reaction was monitored by X-ray diffraction. After 2 hours sample was found to have 100% of a mixture of atacamite/clinoatacamite indicating 100% conversion of the copper oxide (tenorite).

Example 3

In this Example basic copper chloride is produced by reacting cuprous oxide with hydrochloric acid and oxygen by the following equation:

$$2Cu_2O+2HCl+O_2+2H_2O=2Cu_2(OH)_3Cl$$

This reaction was performed by adding 300 ml water and 63.8 ml of hydrochloric acid to a 500 ml beaker equipped with a sparging stone for the addition of oxygen. 100 g of cuprous oxide was added to the solution and then heated to 180° F. Oxygen was continuously bubbled into the mixture throughout the trial. After 2 hours the sample was analyzed by X-ray diffraction for crystal identification. The results showed 93.8% of a mixture of atacamite/clinoatacamite and 6% copper oxide ($Cu_2O$).

Example 4

In this Example basic copper chloride is produced by reacting copper carbonate with hydrochloric acid by the following reaction:

$$Cu_2(OH)_2CO_3+HCl=Cu_2(OH)_3Cl+CO_2$$

This reaction was performed by adding 200 ml of water and 45.8 ml of HCl into a 500 ml beaker. While mixing 100 g of copper carbonate was added to the solution and then heated to 180° F. The mixture was allowed to mix and react at temperature for 24 hrs. During the first 20 minutes of the reaction there was significant bubbling as a result of carbon dioxide being evolved. After 2 hours a sample was pulled and analyzed by X-ray diffraction to determine crystal structure. The results showed that the crystals were 100% of a mixture of atacamite/clinoatacamite with no copper carbonate (malachite) present.

Example 5

In this Example basic zinc chloride is produced by reacting zinc oxide with hydrochloric acid by the following reaction:

$$5ZnO+2HCl+4H_2O=Zn_5(OH)_8Cl_2.H_2O$$

This reaction was performed by adding 200 g ZnO, 104 mL HCl (32%), 190.4 mL $H_2O$, and 13.3 g modified corn starch into a 1 liter reaction vessel. The mixture was heated to 180° F. and allowed to mix for a total of 4 hours. The product was analyzed by X-ray diffraction and found to be 96.5% basic zinc chloride (Simonkoellite) and 3.5% ZnO (zincite).

Example 6

In this Example basic zinc chloride is produced by reacting zinc oxide with zinc chloride by the following reaction:

$$4ZnO+ZnCl_2+5H_2O=Zn_5(OH)_8Cl_2.H_2O$$

This reaction was performed by adding 400 ml water, 118 ml zinc chloride solution containing 170 g/l Zn, and 100 g of zinc oxide into a 1 liter beaker. The mixture was allowed to mix and react at 180° F. for a period of 24 hrs. Samples were pulled periodically and tested for crystal identification by X-ray diffraction analysis. After 24 hours the zinc oxide had converted to 97.2% basic zinc chloride (Simonkoellite) and 2.8% zinc oxide (zincite).

Example 7

In this Example basic manganese chloride is produced by reacting manganous oxide with hydrochloric acid by the following reaction:

$$2MnO+HCl+H_2O=Mn_2(OH)_3Cl_2$$

This reaction was performed by adding 100 ml water, 13.88 ml of HCl (32%) and 20.03 g of manganous oxide into a mixed reaction vessel that had previously been purged with nitrogen. Nitrogen was also bubbled into the mixture for the duration of the reaction to prevent the oxidation of $Mn^{+2}$ to $Mn^{+3}$. The reaction vessel was mixed and heated to 100° C. for 24 hours. A sample of the reacted product was submitted for X-ray diffraction analysis and was found to be 86% basic manganese chloride (Kempite) with the balance being manganese oxides.

Example 8

In this Example basic manganese chloride is produced by reacting manganous oxide with manganous chloride by the following reaction:

$$3MnO+MnCl_2+3H_2O=2Mn_2(OH)_3Cl_2$$

This reaction was performed by adding 100 ml water, 22.49 g of manganous chloride tetrahydrate and 20.14 g of manganous oxide into a mixed reaction vessel that had previously been purged with nitrogen. Nitrogen was also bubbled into the mixture for the duration of the reaction to prevent the oxidation of $Mn^{+2}$ to $Mn^{+3}$. The reaction vessel was mixed and heated to 100° C. for 24 hours. A sample of the reacted product was submitted for X-ray diffraction analysis and was found to be 93.6% basic manganese chloride (Kempite) and 6.3% $Mn_3O_4$ (Hausmanite).

Example 9

In this Example basic metal slurries produced by the reactions described produce very small 0.1-20 μm crystals. The addition of a modified starch binder prior to spray drying allows particle size to be effectively controlled in the 50-300 μm range. While performing pilot trials it was noticed that the starch addition greatly reduces the viscosity of the slurry. This discovery was a significant process improvement allowing for total solid contents of the slurries to be carried as high as 55% and above. This represents a significant reduction in energy required to dry the product as well as the horse power requirements needed for pumping and mixing these slurries. In this Example it was found that starch provided 10 fold reduction in viscosity for a basic copper chloride slurry, with a reduction in viscosity from about 15,000 Cps to about 1,000 Cps when about 2.5 wt. % of starch was added.

Example 10

In this example a laboratory trial was performed to determine the relative reactivity of spray dried tribasic copper chloride (TBCC) compared to a standard production of TBCC produced according to the process in U.S. Pat. No. 6,265,438. This trial was accomplished by placing 1.62 g of copper from each source into 400 ml of an acetate buffer solution (pH 4.7). The solutions were allowed to mix at room temperature for 4 hours. Soluble copper was measured periodically during the trial as a measure of reactivity. The data showed that the spray dried product is slightly higher but similar to the reactivity of the standard TBCC and closely follows the trend line in regards to rate of release.

The basic metal salts of this invention can be used to enhance the survivability, growth rate, health and/or reproductivity in humans and other animals. While not to be bound by any theory, it is thought that the basic metal salts are more readily absorbed and/or exhibit an increased bioavailability over minerals, inorganic metal salts or other nutrients containing the corresponding essential metals. It has been determined the preferred embodiments of the basic metal salts of this invention significantly reduce the growth of bacteria, thus indicating the use of preferred forms of this invention can effectively enhance the growth and health of humans and other animals. Furthermore, the preferred basic metal salts of this invention demonstrate an enhanced efficacy against certain bacteria, thereby allowing for the use of smaller amounts and/or lower concentrations of the essential metals to provide substantially equal or equal potent effects on animals.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A micronutrient supplement that comprises crystals of a basic salt of at least one essential mineral which crystals are agglomerated with a digestible binder to form digestible agglomerated particles,
   wherein the size of the crystals is from about 0.1 μm to about 20 μm and the size of the digestible agglomerated particles is from about 50 μm to about 300 μm.

2. A micronutrient supplement according to claim 1, wherein the digestible binder comprises a pharmaceutically acceptable starch.

3. A micronutrient supplement according to claim 1, wherein the digestible binder comprises up to 10 wt. % of the agglomerated particles.

4. A micronutrient supplement according to claim 1, wherein crystals of a basic salt of at least one essential mineral include at least two essential minerals.

5. A micronutrient supplement according to claim 1, wherein crystals of a basic salt of at least one essential mineral and crystals of a basic salt of at least another essential mineral are agglomerated together with a digestible binder to form digestible agglomerated particles.

6. A micronutrient supplement according to claim 1, in combination with an animal feed.

7. A method of making a micronutrient supplement which comprises the steps of:
   a) reacting a metal oxide, or metal hydroxide, or metal carbonate of an essential mineral and an inorganic acid and/or a metal salt of an essential mineral and a digestible binder to form a slurry comprising micronutrient crystals having a size of from about 0.1 μm to 20 μm and the digestible binder; and
   b) forming agglomerated particles by subjecting the slurry from step a) to spray drying or other means of agglomeration.

8. A method of making a micronutrient supplement according to claim 7, wherein step b) produces agglomerated particles have a size of from about 50 μm to about 300 μm.

9. A method of making a micronutrient supplement according to claim 7, wherein the solids content of the micronutrient crystals in the slurry is up to 75 wt. %.

10. A method of making a micronutrient supplement according to claim 9, wherein the solids content of the micronutrient crystals in the slurry is from about 30 wt. % to about 75 wt. %.

11. A method of making a micronutrient supplement according to claim 7, wherein the reaction mixture in step a) is heated to a temperature of about 180° F.

12. A method of making a micronutrient supplement according to claim 7, wherein the binder comprises a pharmaceutical acceptable binder.

13. A method of making a micronutrient supplement according to claim 7, wherein in step a) one or more metal oxide and/or one or more metal salt and the inorganic acid are reacted.

14. A method of making a micronutrient supplement according to claim 7, further comprising an additional step of:
   c) reacting a metal oxide, or metal hydroxide, or metal carbonate of another essential mineral and an inorganic acid and/or a metal salt of another essential mineral and a digestible binder to form a slurry comprising micronutrient crystals having a size of from about 0.1 μm to 20 μm and the digestible binder;
   combining the slurries of step a) and step c); and
   step b) comprises agglomerating the combined slurries of step a) and step c).

15. A method of making a micronutrient supplement which comprises the steps of:
   a) reacting a metal oxide, or metal hydroxide, or metal carbonate of an essential mineral and an inorganic acid to form a slurry comprising micronutrient crystals having a size of from about 0.1 μm to 20 μm;
   b) adding a digestible binder to the slurry of step a) to form a slurry comprising the micronutrient crystals having a particle size of from about 0.1 μm to 20 μm and the digestible binder; and
   c) forming agglomerated particles by subjecting the slurry from step b) to spray drying or other means of agglomeration.

* * * * *